(No Model.)
J. M. GLENNON.
BICYCLE SEAT SUPPORT.
No. 606,455. Patented June 28, 1898.
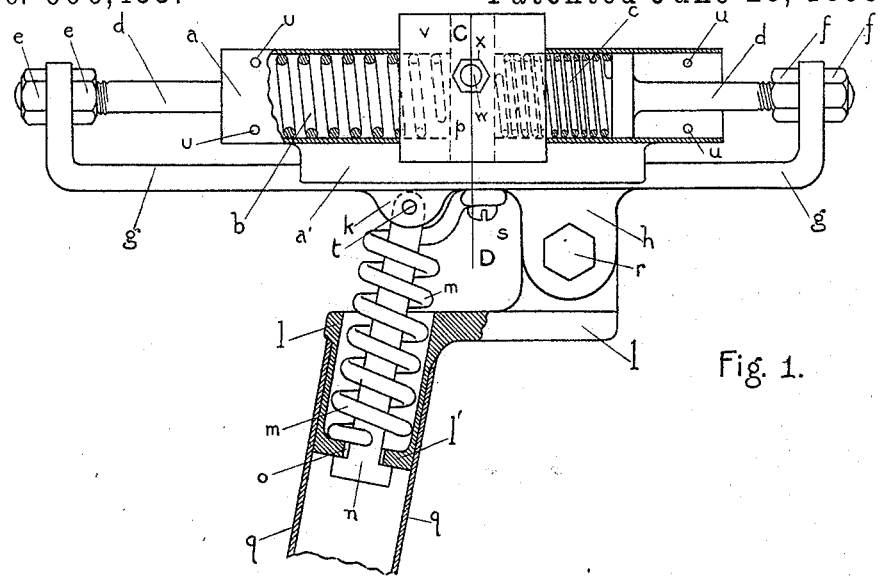
Fig. 1.
Fig. 2.
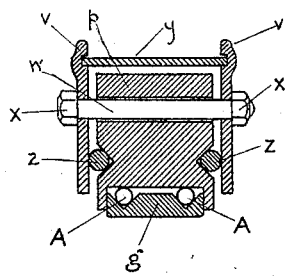
Section on C D
Fig. 3.
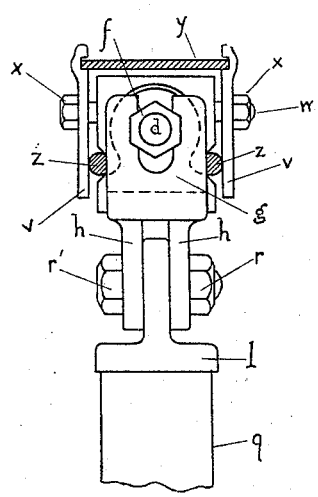
WITNESSES
chas. T. Malcolmson.
T. B. Meincke
Joseph M. Glennon INVENTOR
BY
Hartman & McAndrews
his ATTORNEYS

UNITED STATES PATENT OFFICE.

JOSEPH M. GLENNON, OF CHICAGO, ILLINOIS.

BICYCLE-SEAT SUPPORT.

SPECIFICATION forming part of Letters Patent No. 606,455, dated June 28, 1898.

Application filed September 12, 1896. Serial No. 605,575. (No model.)

*To all whom it may concern:*

Be it known that I, JOSEPH M. GLENNON, a citizen of the United States, residing at Chicago, in the county of Cook and State of Illinois, have invented certain new and useful Improvements in Bicycle-Seat Supports; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in bicycle-seat supports for bicycle or other saddles, in which mechanism is arranged to relieve the jar of the seat in passing over obstructions and uneven roadways; and its objects are to provide a more perfect support for the seat, which shall move readily in two directions and protect the rider from such jars.

The invention consists in the construction and novel combination of parts hereinafter described, pointed out in the appended claim, and illustrated in the accompanying drawings, in which—

Figure 1 is a vertical view of the entire device with parts broken away and attached to the seat-post of a bicycle. Fig. 2 is a cross-section taken on the line C D, and Fig. 3 is an end view of Fig. 1.

Similar letters of reference refer to similar parts throughout the several views.

The entire device consists of two parts, one providing for a longitudinal motion of the seat and the other for a vertical motion, both motions being retarded by springs. The mechanism for the longitudinal motion (backward and forward) consists, essentially, of an attached frame, as $g$, and a seat connection secured to said frame and adapted to ride thereon backward and forward and springs arranged to retard such movements.

In the drawings I have illustrated a preferred form of construction. It consists of the frame $g$, having its ends turned up to form points of attachment for the plunger-rods $d$, which are secured to said ends, respectively, by the burs $e\ e'$ and $f\ f'$, on the inner ends of which are attached plungers or pistons. The frame $g$ is secured in any suitable manner to the seat-post of the bicycle. In the present instance such connection consists of a lug $h$, pivoted to a corresponding lug on the horizontal arm $l$, the other end of the arm $l$ being bent or formed with a downward projection $l'$, which fits into the bicycle-post and secures the arm $l$ thereto. If the frame be attached to the tree of a saddle for equestrian purposes, the frame $g$ is preferably made of two parts, so as to give broader lateral support. Upon this frame $g$ is mounted the seat connection, which consists of the central part $v$, to which the seat is attached, its lower end attached integrally to a rider-plate $a'$, and tubular extensions $a$ are secured on either side of the central part $v$ for the entrance of the plungers or pistons in the ends of the rods $d$ and to hold the springs $b$ and $c$ in place. There is also a partition $p$, placed in the center of the central part $v$, and on both sides of it between the plungers are placed coil-springs $b$ and $c$. Thus constructed the springs consist of the coil-springs, and also of an air-spring formed by the plunger and tube. To admit air into these tubular extensions, small orifices $u\ u'$ are placed near the ends of the tubular extensions $a$, so that when the plunger is at the end of the tube the air will enter. The rider-plate $a'$ has side extensions downward, as shown on Fig. 2, to hold it laterally upon the frame $g$. It rides on ball-bearings A A, which are held in ways or grooves in the frame $g$, as shown in Fig. 2.

The seat can be secured to the seat connection in any suitable manner. Fig. 2 illustrates the means used in the present instance, which consists of two plates placed on two sides of the central part $v$, held and secured and clamped by the bolt $w$ and the burs $x\ x$. If the seat is formed with wire springs, its springs $z\ z$ enter grooves formed on the sides of the central part $v$ and are clamped against it firmly by the bolt $w$, as shown in Fig. 2. If the seat is formed with a flat-bar spring $y$, it is held just above the central part $v$, as shown in Figs. 2 and 3. The operation of this part of the device—to wit, a motion backward and forward and retarding it by the use of springs—is obvious from the description. The seat connection is held in place by the rods $d\ d$, and also by the rider-plate $a'$, engaging sides of the frame $g$, as shown in Fig.

2. Different ways of embodying this mode of operation will readily suggest themselves to those skilled in the art, and I therefore do not confine myself to the particular construction shown.

The vertical movement is provided for by constructing a lug $k$ at the rear of the lug $h$ upon the frame $g$, to which is pivotedly attached a retaining and guiding post $n$, which passes down into the seat-post $q$ and through an orifice $o$ in the projection $l'$. Between the frame $g$ and the lower part of this downward projection $l'$ and encircling the guiding-post $n$ is a coiled spring $m$, arranged to bear the weight of the rider and to yield to sudden jars.

The operation of the entire device is obvious from the description of the mechanism. It provides for a longitudinal movement backward and forward and a vertical movement of the seat. There is also a movement in an inclined direction when the two movements are combined.

Having thus described my invention, what I claim as new, and desire to secure by Letters Patent, is—

In a seat-support for a bicycle or other saddle a frame; the rods provided with plungers or pistons secured thereto; a seat connection provided with tubes for said plungers and a central partition; springs placed between said partition and said plungers within said tubes, and a rider-plate attached to the seat connection adapted to support it and ride upon the frame.

In testimony whereof I affix my signature in presence of two witnesses.

JOSEPH M. GLENNON.

Witnesses:
H. C. HARTMAN,
TILLIE B. MEINCKE.